Aug. 29, 1961  D. F. WILKES  2,997,883
ACCELERATION INTEGRATING MEANS
Filed Sept. 10, 1959  3 Sheets-Sheet 1

INVENTOR:
Donald F. Wilkes
BY

*Attorney*

INVENTOR:
Donald F. Wilkes

Aug. 29, 1961   D. F. WILKES   2,997,883
ACCELERATION INTEGRATING MEANS
Filed Sept. 10, 1959   3 Sheets-Sheet 3

INVENTOR:
Donald F. Wilkes
BY
Attorney 2,997,883
ACCELERATION INTEGRATING MEANS
Donald F. Wilkes, Albuquerque, N. Mex., assignor, by mesne assignments, to the United States of America as represented by the United States Atomic Energy Commission
Filed Sept. 10, 1959, Ser. No. 839,268
7 Claims. (Cl. 73—503)

This invention relates generally to acceleration integrating devices which may be employed to signal the attainment of a predetermined velocity by their carrying vehicle and more particularly relates to such devices in which the total movement of a fluid-retarded acceleration responsive element is proportional to the integral of vehicle acceleration with respect to time, i.e., vehicle velocity. Devices of this type may be utilized, for example, in a rocket to cut off the flow of fuel to the engine when the rocket has attained a predetermined velocity.

An ideal device of this type should function, over a broad environmental temperature range and without regard to the manner in which vehicle acceleration values may have fluctuated in imparting the velocity, to reliably signal the attainment of the predetermined velocity. Also, inasmuch as the aggregate size and weight of vehicle components are determinative of the performance of certain vehicles, such an ideal device should be practically miniaturizable without sacrificing reliability or performance characteristics.

Prior art devices of this general type have not attained these ideals because of a number of inherencies. In attempts at securing uniform performance with changes in environmental temperature, e.g., they have been encumbered with heaters for maintaining the viscosity of their retarding fluids at a constant value. They have also been equipped with gravity compensating force springs which, in acting on the sensitive element at all times, introduce appreciable errors in the integration, especially at low acceleration ranges. These complications have all tended to impair accuracy, reliability, and/or miniaturizability. Also, frictional forces on the sensitive elements are subject to considerable variation, as is leakage of retarding fluid which bypasses the fluid metering means, and both factors introduce integration errors which causes inaccuracy.

It is a principal object of this invention to provide a new and improved acceleration integrating means of superior performance and adaptable for use over low and high value acceleration ranges.

Another object of the invention is the provision of an improved acceleration integrating device employing a fluid restrained acceleration responsive element which in displacing the restraining fluid in response to acceleration causes substantially all such displaced fluid to be metered.

Still another object of the invention is the provision of an acceleration integrating device wherein the sensitive element is floated on a dynamic fluid film substantially throughout its travel, whereby varying frictional effects errors are minimized.

A further object of the invention is the provision of an acceleration integrating device of simple construction particularly adaptable to miniaturization.

A still further object of the invention is the provision of a highly accurate acceleration integrating device wherein fluid heaters and gravity compensating calibrating springs associated with prior art devices are eliminated.

Another object of the invention is the provision of an acceleration integrating device of enhanced reliability and safety wherein commencement of integration is delayed until the device experiences a predetermined low acceleration value and, should the acceleration be diminished below this value, the integration is cut short and the sensitive element is automatically reset to its original or safe position to thereby insure against a false velocity signal due to an instantaneous shock, for example.

Still another object of the invention is the provision of superior temperature compensation enabling the device to operate over a wide range of environment temperatures with substantially uniform results.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

Figure 1:
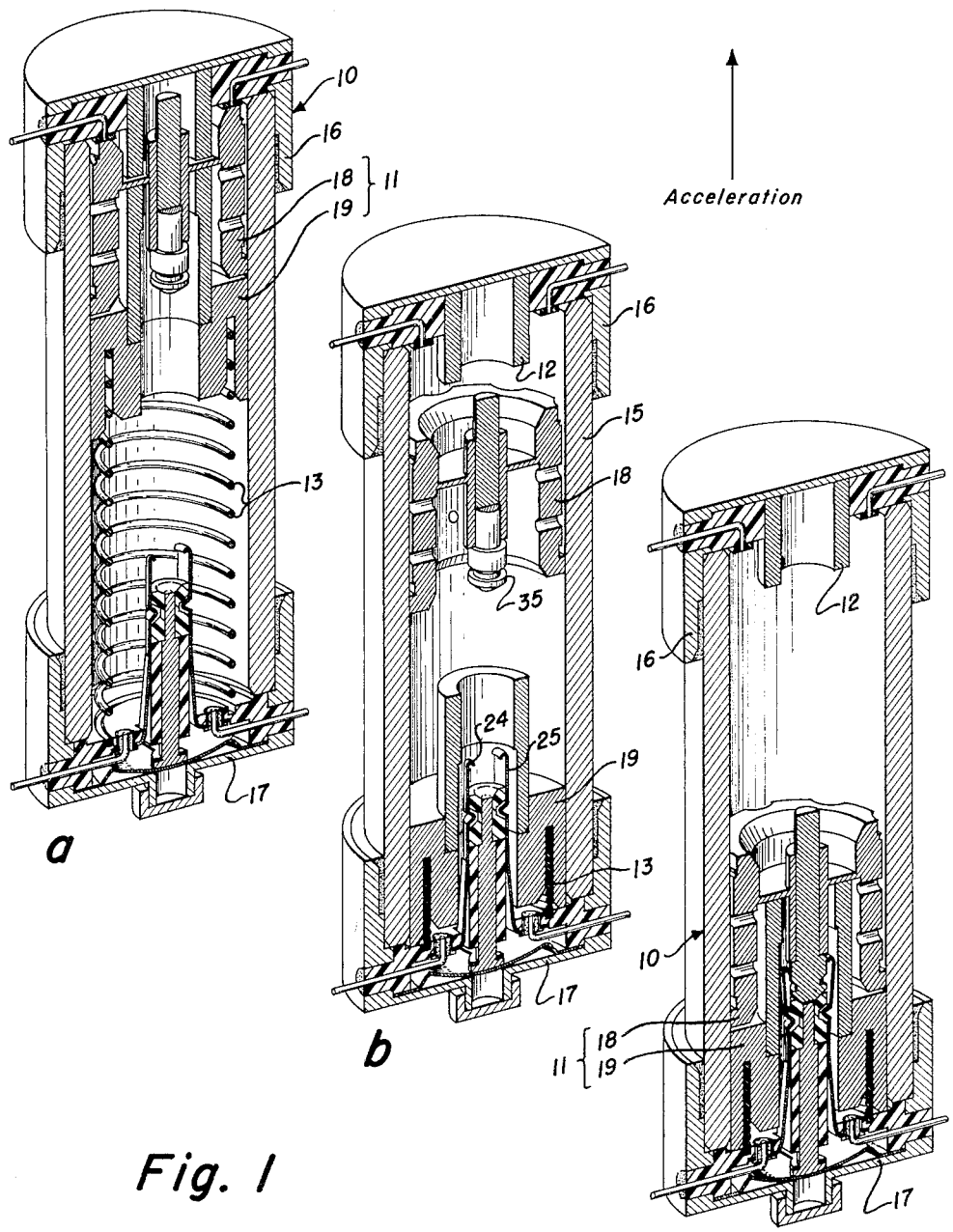
FIG. 1 illustrates, by means of somewhat diagrammatic sectional views, the operating sequence of the device.

Described generally, the device embodying the present invention as shown in FIG. 1 comprises an acceleration integrating switch wherein displaceable piston means responsive to predetermined acceleration-time values operates to close switch contacts 24 and 25 to signal that a predetermined velocity has been attained and, yet, is adapted to automatically reset itself and prevent contact closure should the responsive means be accidentally displaced by an unsustained acceleration such as may be produced by an instantaneous shock.

Figure 2:
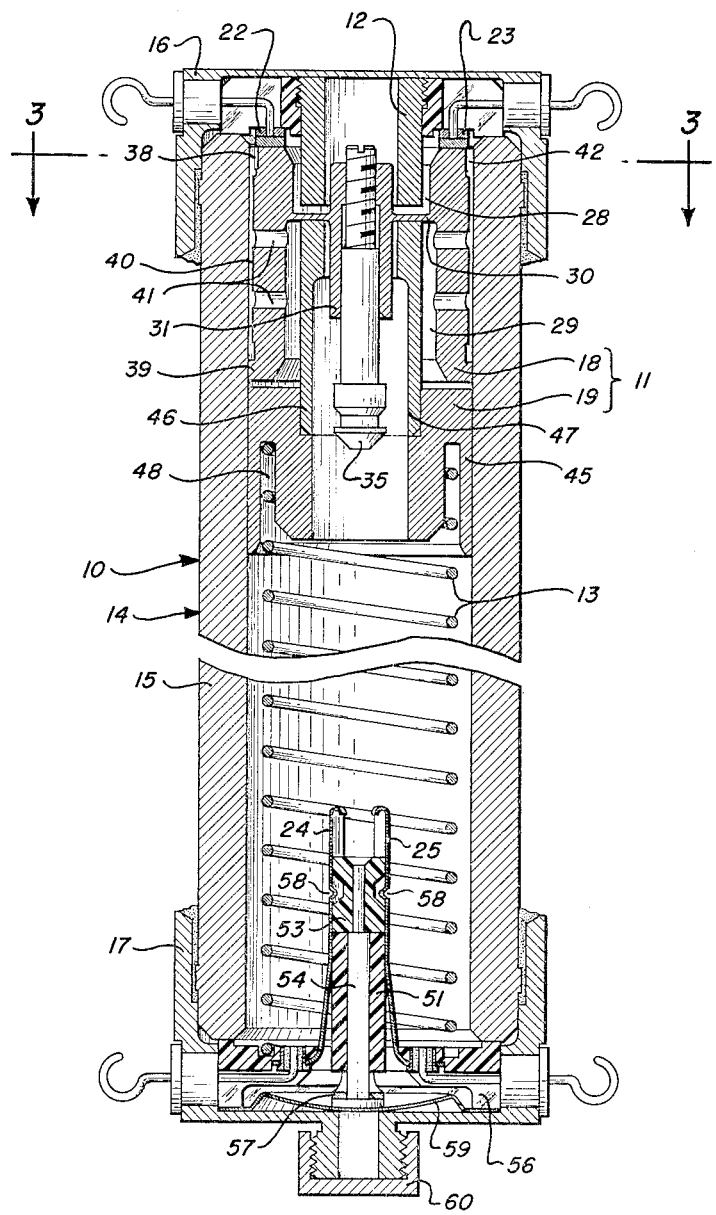
FIG. 2 is an enlarged sectional view showing a preferred embodiment of the invention.
Figure 3:
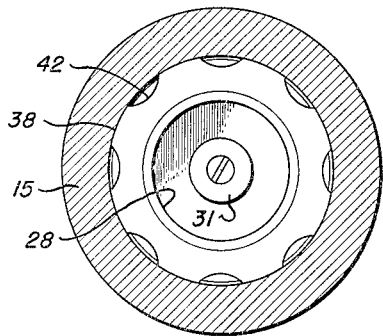
FIG. 3 is a transverse sectional view of the device of FIG. 2.

With further reference to FIGS. 1–3 of the drawings, the invention is shown embodied in an acceleration integrating switch device, generally indicated at 10 in FIGS. 1–2, comprising an acceleration responsive piston system 11 fixedly restrained below predetermined acceleration values by coacting forces exerted by detent magnet 12 and reset compression spring 13.

As may be best seen in FIG. 2, the device 10 generally includes a housing 14 comprised a cylinder 15 and forward and rear cylinder closure caps, 16 and 17 respectively; an acceleration-sensitive piston system 11, comprised of fluid metering piston 18 and breakaway mass 19, movable in said cylinder in response to acceleration experienced by the device; and reset compression spring 13 interposed between the breakaway mass 19 and the rear cylinder closure cap 17. Forward (normally closed) contacts 22, 23 and rear (normally open) contacts 24, 25 may be respectively mounted on the inner surfaces of the forward and rear cylinder closure caps. These contact sets are adapted to be shorted or bridged by the piston and, when shorted, signal the piston position in the cylinder by means of suitable external electrical circuitry, not shown.

The piston 18 is shown as a cylindrical, generally hollow, member made of non-magnetic material, e.g., beryllium-copper, having forward and rear axial bores, 28 and 29 respectively. These bores terminate within the piston body at a thin transverse web 30 which serves as a fluid barrier between the two bores. A central web boss 31 which extends forwardly and rearwardly from the web serves to threadedly receive and support a rearwardly extending shorting "spear" member 35 in coaxial alignment with the rear piston bore 29. As will appear later in the description of the operation of the device, the spear member 35 serves to short or bridge the rear (normally closed) contacts 24 and 25 to produce a signal or actuate some desired mechanism when the device is properly actuated. The complementary threads on spear member and web boss facilitate longitudinal adjustment of the spear member for optimum cooperation with the rear contacts 24—25.

Certain other features of the piston are related to its fluid metering function and to the generation of a fluid bearing film to "float" the piston between the cylinder walls in the course of piston excursion therein. These features include spaced forward and rear annular piston guide lands 38 and 39, respectively; a cylindrical bearing and metering portion 40 therebetween which together with the cylinder walls defines a fluid bearing and metering annulus; fluid inlet holes 41 to the portion 40 from the rear piston bore 29; and fluid exhaust notches 42 in the forward piston guide land 38. The guide lands are of a diameter such that they are a close sliding fit with the cylinder walls of the device in order that the piston may be maintained in substantially perfect axial alignment with the cylinder at all times. The cylindrical fluid bearing and metering portion 40 has a somewhat larger clearance with the cylinder bore, as examples, the diametral clearances of a device to operate with air as the metered restraining fluid may have a guide land-cylinder clearance in the neighborhood of .0007 inch and a fluid bearing-metering surface to cylinder wall clearance in the neighborhood of .0014 inch.

Although any suitable fluid may be used in the device, one of the inert gases, e.g., helium, is to be preferred since such a gas would provide a non-corrosive atmosphere within the housing and thereby enhance the reliability of the device. Also in this connection, the seal required to contain the inert gas would also exclude moisture and other foreign matter which might interfere with the reliable operation of the device.

The fluid inlet holes 41 in the piston body are shown leading substantially radially from the rear piston bore 29 into piston bearing and metering portion 40. These holes are arranged in number and location to secure a balanced fluid distribution over and adequate flow of fluid to the bearing-metering portion 40. In the instant device, for example, 12 fluid inlet holes 41 may be arranged in two spaced annular rows located so that one is forward of and the other is rearward of the piston center of gravity in order to secure fore and aft balance and stability of the piston. For purposes of simplifying the drawing, however, only two inlet holes of each radial row are shown.

When the piston is moved rearwardly in the cylinder, fluid is displaced from the rear of the piston to ahead of it by being conducted from the rear piston bore 29 via radial inlet holes 41 and into the annular metering space defined by piston portion 40 and the walls of the cylinder 15, where, by virtue of its flow in the metering-bearing space it serves as a fluid film bearing to support or "float" the piston and then is ultimately exhausted to the front of the piston through exhaust notches 42. In addition to providing a film bearing for the piston by virtue of the fluid flow therethrough, the metering-bearing space as defined above presents a pressure dropping restriction through which the rate of fluid flow is proportionate to the fluid pressure generated as a consequence of the piston moving force. This latter point will be developed more fully in describing the operation of the overall device.

Normally (at rest), the piston system is positioned at the forward end of the cylinder, in bridging or shorting relation to the normally closed forward contacts 22, 23, by breakaway mass 19 which is biased thereagainst by reset compression spring 13.

Breakaway mass 19 is additionally forwardly biased by the attractive force of a detent magnet 12. The magnet, which may be of tubular form, is shown affixed to the inner surface of the forward closure cap 16 such that the magnet is disposed between the normally closed forward contacts 22, 23 and extends coaxially and telescopically within the bore of cylinder 15. When the piston is in its normal position with its forward end in bridging or shorting relation to contacts 22, 23, magnet 12 extends telescopically within the forward piston bore 28 and about the forward extending portion of web boss 31. The distal end of the magnet is in close proximity to web 30 when the piston is in this normal position.

Breakaway mass 19 may be comprised of a cylindrical afterbody 45 (may be made of material of relatively high density, e.g., tungsten alloy, which enables the breakaway mass to generate relatively high forces when it experiences accelerations of low order) in slip fit relation with the walls of cylinder 15 and a forwardly extending tubular member 46 (made of material having good magnetic properties, e.g., soft iron) of smaller diameter than rear piston bore 29. The tubular member 46 may be installed by press fit, for example, within a through bore 47 in the afterbody 45. The assembled breakaway mass 19 consequently has a central through bore consisting of through bore 47 and the bore of the tube 46.

Normally (device at rest), the forward extending tubular member 46 telescopes within the rear piston bore 29 of the fluid metering piston 18 and about the shorting spear member 35 extending rearwardly from web boss 31. This telescopic arrangement positions the forward end of tubular member 46 in close proximity to web 30 and within the field of effective magnetic force emanating from detent magnet 12, which field is substantially undiminished by its penetration of the thin non-magnetic web 30. In attracting the mass 19, detent magnet 12 indirectly exerts an attractive force on the piston 18 disposed therebetween which tends to maintain the piston in its normal or rest position in bridging or shorting relation to the normally closed forward contacts 22, 23.

Figure 5:
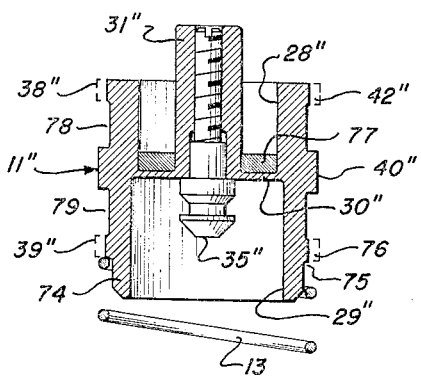
FIG. 5 is a cross-sectional view of still another modified piston adaptable for use in the device of FIG. 2.

The rear end of breakaway mass afterbody 45 has a circular groove 48 therein which the forward end of compression spring 13 seats. Spring 13, interposed between the afterbody 45 and the rear cylinder closure cap 17, functions to normally assist magnet 12 in holding the elements of the piston system in their normal positions and to return these parts to their normal positions after an excursion in response to acceleration forces. Groove 48 (preferably of such depth that it can substantially contain spring 13 when the coils thereof are stacked) may be provided as a seat for compression spring 13 or the spring may be seated on a simple shoulder 75 as shown in FIG. 5.

The rear cylinder closure cap 17 has an insulated tubular column 51 extending within and in coaxial relation to the cylinder 15. Rear contacts 24, 25 are disposed immediately adjacent this column at opposing sides thereof and extend in cantilever fashion beyond the distal end of the column where they jointly comprise a spring latching device having inwardly extending projections adapted to project into a recess on the spear 35 and engage a shoulder thereon to lock the spear 35 in its rear or post acceleration position. This locking feature operates to positively hold the piston 18 and, in turn, the breakaway mass 19 from being reset automatically by spring 13 in event acceleration forces should be diminished or reversed in sense after a complete piston excursion. This assures that, once the device has enjoyed a complete excursion, the normally open contacts will remain closed or bridged by the piston spear 35.

In order to facilitate testing and calibration of the device, means are provided for manually releasing the spear-latching rear contacts 24, 25 after a test excursion of the device. These means include a contact-spreading cam 53 disposed between contacts 24, 25 at the distal end of tubular column 51 and a cam actuating rod 54 affixed thereto and slidably extending rearwardly within column 51. The rear end of cam actuating rod 54 projects into a spring-diaphragm compartment 56 within the rear cap where it is resiliently held by a leaf spring 57. The cam-actuating rod element 54 and cam 53 attached thereto are longitudinally positioned by leaf spring 57 so as to normally exert no spreading force with respect to the cam engaging surfaces 58 of the contacts 24, 25. The compartment 56 as well as the entire device is preferably sealed with respect to the atmosphere by a flexible diaphragm 59 which allows external force to be transmitted therethrough, e.g., by means of a rod (not shown) to move cam 53, by means of cam actuating rod 54, into spreading engagement with the cam engaging surfaces 58 and thereby accomplish separation of the contacts to release the spear 35. When so released the reset spring 13 functions to restore all the moving parts of the device to their normal or rest positions. When the parts have been so restored, forward contacts 22, 23 will again be shorted by the forward end of the piston and thus signal that the device is reset. Access to the compartment 56 and diaphragm 59 may be provided by removable threaded closure cap 60.

The weights of the piston system components and the forces exerted thereon by the detent magnet 12 and reset spring 13 affect initial acceleration response characteristics of the device. These values may be varied by the designer to obtain piston movement initiation characteristics suitable to the particular application for which the design is intended. As an example, the force and weight constants for a device, the piston movement of which is to be initiated at relatively low values of acceleration, may be as follows:

|  | Grams |
|---|---|
| Weight of piston 18 | 5 |
| Weight of breakaway mass 19 | 15 |
| Total weight of piston system 11 | 20 |
| Preload force of reset spring 13 on mass 19 | 30 |
| Force sufficient to bottom or stack spring 13 | 45 |
| Attractive force of detent magnet 12 for mass 19 | 30 |

A device endowed with the above exemplary set of weight and force constants and suitably aligned and mounted with its forward end extending in the direction of acceleration of its carrying vehicle would operate substantially as follows. At rest and at low values of acceleration, the various elements of the device are relatively disposed (rest position, FIG. 1A) as has been described in connection with the preceding structural description. With the above exemplary force values of 30 grams for detent magnet 12 and 30 grams for reset spring 13 which coact on breakaway mass 19 there is a combined force of about 60 grams tending to hold the piston system 11 in the forward or rest position. This combined force of magnet 12 and spring 13 (60 grams) is adequate to maintain the piston system 11 (weighing a total of 20 grams in a one-g field) immobilized in the rest position (forward) so long as the effective weight of the piston system elements as influenced by acceleration does not exceed about 60 grams, or, stated differently, the acceleration value does not exceed about 3 times the acceleration due to gravity. In the rest position, forward normally closed contacts 22, 23 are electrically shorted or bridged by the piston and furnish a convenient means for electrically testing to determine that the piston is forward or has been reset after a test excursion. In this explanation it is to be understood that the values employed are illustrative only since practical manufacturing tolerances may result in slightly different performances among different units of a same general design.

At substantially the instant the vehicle acceleration increases through the value of 3g, the piston system parts will exert a force in excess of the 60 gram combined force of the spring and detent magnet and will begin to move rearwardly in the cylinder away from magnet 12 (the attractive force of which diminishes rapidly with distance) and the force of breakaway mass 19 (weight 15 grams) under the influence of acceleration of 3g (effective force of 45 grams) is suddenly substantially totally imposed on spring 13 which is designed to "bottom out" at this force value. This causes the breakaway mass 19 to rapidly move rearwardly in the cylinder and to dispose itself in telescoped fashion about tubular column 51 and rear contacts 24, 25 (FIG. 1B). The piston 18 is thus suddenly freed to move rearwardly in the cylinder in response to further acceleration with no impediment other than fluid resistance as will be seen.

This delayed "snap" release of the piston after vehicle acceleration has commenced is of importance to consistent performance since it tends to assure that during every piston excursion frictional resistance will be minimized by securing film bearing flotation of the piston substantially throughout its travel. By virtue of its delayed snap release from restraint the piston mass under the influence of 3g acceleration value is able to exert sufficient force on the fluid to its rear to cause the fluid to commence flowing in the cylinder from the rear of the piston to in front thereof via the radial inlet holes 41, the annular metering-bearing space defined by piston portion 40 and the walls of the cylinder, and exhaust notches 42. This flow establishes a fluid film bearing on which piston 18 "floats" or rides, with the result that frictional contact of the piston with the cylinder walls is substantially eliminated substantially throughout the movement of the piston.

Presuming the carrying vehicle continues acceleration at or above the 3g rate, the piston will remain free and continue rearwardly in response to the acceleration until it ultimately brings its rear extending spear member 35 into internal telescopic relation within tubular member 46 and into latching engagement with rear contacts 24, 25 extending therewithin. The rear contacts, when shorted or bridged by the end of spear 35, signal the arrival of the piston at its rear position in the cylinder (FIG. 1C) and the resulting circuit closed through contacts 24, 25 and spear head 35 may effect actuation of any desired associated apparatus (not shown).

At any instant in its travel rearwardly in the cylinder 15, the setback force of the piston 18 is a function of vehicle acceleration at that instant as is, in turn, the fluid pressure generated in the cylinder to the rear of the piston by virtue of the setback force. The rate of the fluid flow through the bearing-metering annulus between the walls of cylinder 15 and the bearing-metering portion 40 of piston 18 is a function of the pressure to the rear of the piston which, in turn, is related to vehicle acceleration. The total quantity of fluid passed by the metering space in a time interval is the integral over the interval of the rate of fluid flow therethrough. Upon reflection it will be seen that the total quantity of fluid passed is also proportional to the integral of vehicle acceleration with respect to time, which is vehicle velocity. From the foregoing, it will be apparent that the total amount of fluid passed by the metering annulus, i.e., the total fluid displaced by the piston, from the time of piston release to any subsequent time within the limits of piston stroke will determine the piston location longitudinally of the cylinder at such subsequent time.

It should be noted that this piston positioning, in resulting from the integration process described, is substantially independent of the manner in which the vehicle acceleration may have fluctuated in imparting the particular velocity to the vehicle. Thus it is seen that velocity attained at any time by the carrying vehicle will be uniquely indicated by the longitudinal position of the piston in the cylinder at any instant. It may be further seen that the piston-carried spear 35 will short or bridge rear contacts 24, 25 upon the vehicle's attainment of a predetermined velocity value and that external electrical circuitry closed by these contacts may be utilized to signal the attainment of this predetermined velocity by the vehicle.

In event that the carrying vehicle does not continue acceleration at or above the 3g rate for such time as the piston requires in executing a complete excursion, the progress of the piston in the cylinder will be interrupted short of the point of contact closure. Such an event may occur, for example, when the breakaway mass 19 is dislodged and separated from the piston by an instantaneous shock due to impact or when the acceleration of the vehicle is reduced below the minimum value or becomes reversed in sense. On such an occurrence, the effective force of breakaway mass 19 on reset compression spring 13 will be reduced such that the spring will return the breakaway mass to the forward end of the cylinder. As breakaway mass 19 moves forwardly it will again come in contact with the piston 18, which had been stopped at some intermediate point in the cylinder due to this change in acceleration, and carry piston 18 back to its original rest position in the forward end of the cylinder where it again comes under the influence of the attractive force of detent magnet 12. It is apparent that this automatic reset of the piston system 11 will prevent complete actuation of the device and the shorting or bridging of the rear contacts 24, 25 of the device in the event accelerations at or above the minimum value are not continued for a time sufficient for the vehicle to attain the predetermined velocity.

In addition to the provision of a low friction fluid bearing for the piston and other advantages derived from the construction of the device, the piston cooperates with the cylinder walls to achieve temperature compensation necessary to enable the device to perform with substantially uniform characteristics over a wide range of environmental temperatures. The temperature compensation is achieved by controlling the size of the metering clearance in response to temperature in a manner such that the resistance to fluid flow therethrough is substantially constant irrespective of changes of fluid viscosity. In order to achieve this change in clearance with temperature, the piston and cylinder are made of metals with appropriately different coefficients of expansion such that the metering clearance is appropriately reduced or increased (as the case may be) to compensate for diminished or increased viscosity as a result of temperature change.

Temperature coefficients of expansion of materials are generally positive and of low order while the viscosities of fluids generally vary widely (generally directly for gases and inversely for liquids) with temperature change. To secure compensation for liquid viscosity changes such that a metering orifice will produce a substantially constant pressure drop over a temperature range requires that the effective orifice size vary inversely with temperature change. These divergent conditions are resolved in the device of the invention in that the differential expansion of the piston and cylinder is adapted to produce such an inverse change in the effective size of the metering clearance, the direction of compensation is, of course, dependent on the choice and relative arrangement of materials. A second problem incident to securing substantially constant flow orifice compensation directly from the expansion characteristics of materials is the disproportionately small size variation of practical materials in contrast to the relatively large variation in fluid viscosities as a consequence of a given temperature variation. It is apparent that the variation in flow area of a simple orifice, for example, due to a temperature diameter change is generally not sufficient in magnitude to adequately compensate for the change in the viscous flow properties of a fluid for the same temperature change. In contrast, depending on the choice of materials, the annular clearance metering "orifice" area of the present invention may undergo a significant percentagewise change sufficient to practically offset temperature changed flow properties of the fluid, and thereby secure substantially constant pressure drop across the "orifice." It should be noted, in connection with this explanation, that the diameters of both piston and cylinder are relatively large in comparison to their clearance, such that small percentage changes in diameter due to temperature expansion may give rise (again dependent on choice of materials) to relatively large percentage changes in the clearance (which defines the effective metering flow area). This annular arrangement thus permits the designer, in selecting and arranging the material utilized for piston and cylinder, to endow the device with a great variety of automatic temperature compensations (as varied as there are combinations and arrangements of materials with differing expansion coefficients) which may be chosen to approximately match and offset percentage changes in the flow properties of the particular fluid with temperature. It is apparent that the designer, if desirable for a particular application, may also cause the device to over or under compensate.

The combination of a piston made of "K-Monel" and a cylinder made of beryllium copper have been found to achieve a practical degree of temperature compensation for gaseous fluids. However, these metals are merely an example of many combinations of materials which, as noted above, may be utilized. It should be noted further that, in selecting the materials and consequent compensation due care must be given so as to allow some clearance over piston lands 38, 39 to remain at the limits of the expected temperature range.

Figure 4:
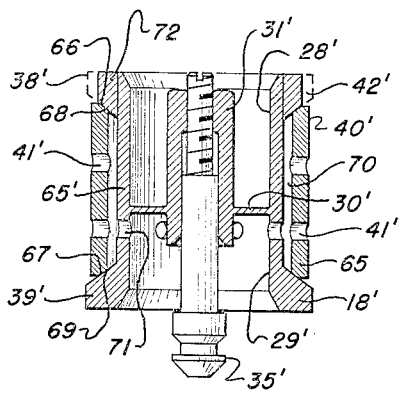
FIG. 4 is a sectional view of an alternate piston form adaptable for use in the device of FIG. 2.

Another means of temperature compensation is employed in the piston modification of FIG. 4. This piston may be interchanged with the piston element 18 of the preferred embodiment but differs therefrom in that it employs a multipart piston which permits a more precise compensation to be made, i.e., it permits compensation selection independently of land clearance considerations.

Like piston 18, the piston body 18' of FIG. 4 is generally of hollow cylindrical form made of non-magnetic material and having forward and rear bores 28' and 29' respectively, which terminate at a web 30' which carries boss 31' and shorting spear member 35'. It differs from the piston 18 of the preferred embodiment in that the body 18' including forward and rear guide lands 38' and 39' respectively, may be made of the same material as the cylinder in which it is to operate, e.g., beryllium copper, inasmuch as the active temperature compensating element is embodied in a separate sleeve member 65 concentrically mounted about the body 18' and above a reduced diameter body portion 65' intermediate the guide lands 38', 39'. The sides 66, 67 of the reduced diameter body portion 66 are tapered such that they match abutting complementary sleeve tapers 68, 69 located at the ends of sleeve 65. The sleeve 65 is concentrically and firmly supported and held by the abutting tapers above the reduced diameter body portion 65' such that an annular space 70, which as will appear functions as a fluid distribution plenum, is formed therebetween. The material of which sleeve 65 is made would be selected primarily with regard to its coefficient of expansion and the compensation desired by the designer. As an example, the sleeve made of nickel on a beryllium-copper body (working in a beryllium-copper cylinder) permits a high degree of temperature compensation for the changes in flow properties of air with temperature change.

The mode of supporting the sleeve 65 on body member 18' firmly holds the sleeve concentrically with respect to the body at all times, but, also allows relative movement between the two parts along the abutting tapers in response to differential size changes. The angles of the tapers are a function of only the geometry (length and diameter) of the piston and are not in any way dependent on the properties of the materials employed.

The bearing and metering portion 40' (the exterior of sleeve 65) is of smaller diameter than guide lands 38', 39' and functions in the same manner as the fluid bearing and metering portion 40 of the piston of the preferred embodiment. Sleeve 65 is radially penetrated by a pattern of fluid distribution holes 41' which communicate with annular plenum space 70. Plenum inlet holes 71 communicate the plenum to the rear piston bore 29'.

As a practical consideration, the forward guide land 38' and forward side of groove 66 comprise a separate ring-shaped part 72 to permit assembly of the sleeve 65 on the body 18'. This part 72 has exhaust notches 42' about its circumference (through the guide land portion) to provide for fluid exhaust of displaced metered fluid when the piston is actuated, as described for the preferred embodiment. The path of fluid flow is through plenum inlet holes 71, to space 70, through fluid distribution holes 41', over the exterior of sleeve 65 (piston-cylinder metering clearance), and then to exhaust via the notches 42' in part 72.

FIGURE 5 illustrates another modified piston "system" 11" which is interchangeable with the 2-part system of the preferred embodiment in certain applications not requiring the accurate low range integration obtainable with the preferred embodiment, i.e., not requiring a completely free piston. The piston "system" 11" is a unitized, generally hollow, cylindrical member made of non-magnetic material, e.g., "K-Monel," and having forward and rear bores 28" and 29", respectively, which terminate at a web 30" which, in turn, carries a shorting spear member 35" by means of a boss 31". These various features of the modified (unitized) piston "system" are adapted to fit and coact with the fixed elements within the housing 14 of the principle embodiment in much the same manner as similar features of the 2-part piston system which it may replace.

Externally the modified piston "system" 11" has forward and rear guide lands 38" and 39", respectively, and forward and rear plenum grooves 78 and 79, respectively, located intermediately adjacent the guide lands 38" and 39", respectively, and spaced by a fluid bearing and metering portion 40". A cylindrical extension 74 of reduced diameter extends concentrically and rearwardly of rear guide land 39" and forms a stepped shoulder 75 in joining guide land 39". Exhaust notches 42" in the forward guide land function as in the preceeding embodiments.

The modified piston "system" provides for the introduction of fluid from its rear into the fluid bearing and metering portion 40" through inlet notches 76 in the rear guide land 39" (similar to exhaust notches 42") into rear plenum groove 79 and thence into portion 40". The fluid is exhausted from bearing and metering portion 40" via forward plenum groove 78 and forward exhaust notches 42". It is to be understood that this means of introducing fluid to the bearing and metering portion may be employed, as well, in the preferred or other piston embodiments.

This unitary piston "system" retains the initial "snap" release feature of the preferred embodiment, in that it carries a soft iron washer 77, preferably pressed fitted, in the bottom of its forward bore 28" upon which detent magnet 12 in the forward end cap of the housing 14 may exert an attractive force when the unitary piston system is at rest in the forward position. Also, as in the preferred embodiment, the modified (unitary) piston "system" is additionally urged forwardly by the reset compression spring 13 which, in assembly with the modified piston "system," encircles the cylindrical extension 74 and seats on stepped shoulder 75.

When the device is so interchangeably modified, i.e., with the unitary piston "system" installed, the piston is under restraint of spring 13 at all times, but since such a modification would be employed at relatively high acceleration ranges, the force exerted by the spring is negligible as compared to the other forces involved, and therefore does not substantially effect accuracy.

The device of the invention when employing the unitary piston "system" 11" still retains the automatic piston reset protection against instantaneous shocks, temperature compensation, and the accurate metering and fluid bearing features of the preferred embodiment. Its operation is substantially the same as that of the preferred embodiment with the principal exception that the piston is not entirely freed as in the case of the 2-part piston system. The forces of the magnet and the spring as well as the weight of the unitary piston "system" are selectable in accordance with applicable principles described in connection with the preferred embodiment for operation over relatively high acceleration rate ranges.

Thus it has been seen that the present invention provides a new and improved acceleration integrating device which may be simply compensated for temperature to give reliable substantially uniform performance over relatively wide ranges of environmental temperature. It also has been seen that the invention provides a wide latitude for the designer in adapting the device to the performance demands to be met in particular applications. In addition, it has been seen that the device is especially adaptable to miniaturization because of its simplicity and because of the unique annular metering "orifice." This latter feature of utilizing the piston clearance for metering purposes is of primary importance in permitting the significant degree miniaturization possible. As an illustration of the degree of miniaturizations possible, devices of thoroughly acceptable performance, including temperature compensation, may be enclosed within a space of less than one cubic inch as contrasted to prior art devices of inferior performance occupying 120 cubic inches.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

I claim:

1. A device of the character described comprising the combination of a cylinder with means closing the opposite ends of said cylinder and adapted to contain inert fluid therein, magnetic means carried by the cylinder adjacent one end thereof, piston means within said cylinder comprising a first portion of substantially non-magnetic material adjacent said one end of the cylinder having an aperture for transfer of said inert fluid through said first portion, and a second portion of partly magnetic material separable from said first portion and normally subject to the effect of said magnetic means for urging said first portion adjacent said one end of the cylinder, spring means within said cylinder for urging said second piston portion toward said first piston portion, and an electrical contact carried by one of the end closing means for controlling a circuit in response to movement of said first portion along a substantial length of said cylinder.

2. A device as claimed in claim 1, wherein the first piston portion includes a recessed central portion providing a relatively thin section adjacent the magnetic means, and a magnetic material part of the second piston portion is normally disposed within said recessed portion adjacent said relatively thin section for retention by the magnetic means.

3. A device as claimed in claim 1, wherein the second piston portion has a central aperture therethrough, said electrical contact extends from another end of said housing and is registrable with said aperture, and the first piston portion is provided with a projection for engaging said electrical contact through said aperture.

4. A device as claimed in claim 1, wherein said second piston portion has a central passage therethrough for fluid flow toward said first piston portion, and said first piston portion has a hollow interior and a circumferentially recessed exterior defined by spaced apart lands and said aperture comprises a plurality of ports interconnecting said interior and exterior for conducting fluid to said exterior.

5. A device as claimed in claim 4, wherein at least one of said lands has a plurality of circumferentially spaced notches for facilitating fluid flow past the land.

6. An integrating accelerometer of the type described comprising in combination a housing forming a cylinder having oppositely disposed closed end walls, piston means within said cylinder comprising a first piston portion of substantially non-magnetic material having at its outer periphery spaced apart lands adjacent opposite ends thereof for forming an annular recess between said lands and having an interior configuration of generally opposed concave shapes with a relatively thin wall section therebetween, a projection centrally located on said thin wall section and extending laterally therefrom, annular magnetic means adjacent one of said end walls adapted to extend into one of said concave shapes so as to be adjacent said thin wall section, said piston means including a second piston portion of generally annular shape and separable from said first piston portion comprising at least partly magnetic material and having an annular projection adapted to extend into the other of said concave shapes so as to be subject to said magnetic means for urging said first piston portion against said one end wall of the cylinder adjacent said magnetic means, spring means within said cylinder between said second piston portion and the other of said end walls for urging the second piston portion against said first piston portion, and an electrical contact carried by the housing adjacent said other of the end walls and extending into the cylinder, whereby movement of said projection with the first piston portion within said cylinder effects an electrical connection when contact is established with said electrical contact.

7. The device of claim 6 wherein the annular projection of said second piston portion is of magnetic material and fluid apertures are provided interconnecting the concave shape of the first piston portion adjacent said second piston and said annular recess between the lands, and at least one of said lands has grooves therein for fluid passage from said recess to a space adjacent said one end wall.

References Cited in the file of this patent

UNITED STATES PATENTS

| | | |
|---|---|---|
| 1,407,320 | Bouche | Feb. 21, 1922 |
| 2,603,726 | McLean | July 15, 1952 |
| 2,637,791 | Bleier | May 5, 1953 |
| 2,659,589 | Hickman | Nov. 17, 1953 |
| 2,713,097 | Wooten | July 12, 1955 |
| 2,846,208 | Audemar | Aug. 5, 1958 |
| 2,850,590 | Marks et al. | Sept. 2, 1958 |
| 2,854,539 | Ruppel | Sept. 30, 1958 |
| 2,863,961 | Bonnell et al. | Dec. 9, 1958 |
| 2,881,277 | Marks et al. | Apr. 7, 1959 |
| 2,881,870 | Thumin | Apr. 14, 1959 |
| 2,898,416 | Clurman | Aug. 4, 1959 |
| 2,950,908 | Rainsberger et al. | Aug. 30, 1960 |

FOREIGN PATENTS

| | | |
|---|---|---|
| 1,115,057 | France | Dec. 26, 1955 |
| 686,705 | Great Britain | Jan. 28, 1953 |